(12) United States Patent  (10) Patent No.: US 8,014,240 B2
Kondo et al.  (45) Date of Patent: Sep. 6, 2011

(54) OPTICAL DISK DEVICE, METHOD OF CONTROLLING OPTICAL HEAD, AND CONTROL DEVICE FOR OPTICAL HEAD

(75) Inventors: Kenji Kondo, Osaka (JP); Takashi Kishimoto, Nara (JP); Kenji Fujiune, Osaka (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 12/294,510

(22) PCT Filed: Mar. 29, 2007

(86) PCT No.: PCT/JP2007/056958
§ 371 (c)(1),
(2), (4) Date: Sep. 25, 2008

(87) PCT Pub. No.: WO2007/116810
PCT Pub. Date: Oct. 18, 2007

(65) Prior Publication Data
US 2010/0238777 A1   Sep. 23, 2010

(30) Foreign Application Priority Data

Mar. 31, 2006  (JP) .................................. 2006-098818

(51) Int. Cl.
*G11B 7/00* (2006.01)
(52) U.S. Cl. ................ 369/44.28; 369/53.28; 369/53.23
(58) Field of Classification Search .................. None
See application file for complete search history.

(56) References Cited

U.S. PATENT DOCUMENTS

2004/0076090 A1*  4/2004  Ishibashi et al. ........... 369/44.29
2004/0165493 A1*  8/2004  Fukui ......................... 369/44.32

FOREIGN PATENT DOCUMENTS

| JP | 08-036765 A | 2/1996 |
|---|---|---|
| JP | 10-064080 | 3/1998 |
| JP | 10-083540 | 3/1998 |
| JP | 2000-123377 A | 4/2000 |
| JP | 2001-084605 A | 3/2001 |
| JP | 2001-222827 A | 8/2001 |
| JP | 3567639 B2 | 6/2004 |

OTHER PUBLICATIONS

JP Office Action, Mar. 23, 2010, Panasonic Corporation.
International Search Report for Application No. PCT/JP2007/056958 dated Jul. 3, 2007.

* cited by examiner

*Primary Examiner* — Joseph Feild
*Assistant Examiner* — Ifedayo Iluyomade
(74) *Attorney, Agent, or Firm* — RatnerPrestia (57) ABSTRACT

An optical disk device includes a DPDTE signal generating section that detects misalignment between a light spot and a mark or a pit, an FE signal generating section, an optical crosstalk correcting section which corrects a signal output by the FE signal generating section using the DPDTE signal generating section, and a focus control section which controls an actuator so that a light beam converges on an information layer. The DPDTE signal generating section detects the misalignment on the basis of phase information obtained from signals received from predetermined light receiving areas. The optical crosstalk correcting section performs a correcting operation of removing a signal component from predetermined receiving areas of a detector which component is used for a DPDTE signal, the signal component being contained in the signals from the predetermined light receiving areas of the detector which signals are used by the FE signal generating section.

7 Claims, 10 Drawing Sheets

Fig.7(a)
Sectional view of
a first information
layer 106a

Fig.7(d)
Sectional view of
a second information
layer 106a

OPTICAL DISK DEVICE, METHOD OF CONTROLLING OPTICAL HEAD, AND CONTROL DEVICE FOR OPTICAL HEAD

CROSS-REFERENCE TO RELATED APPLICATIONS

This application is a U.S. national phase application of PCT International Patent Application No. PCT/JP2007/056958 filed on Mar. 29, 2007, claiming the benefit of priority of Japanese Patent Application No. 2006-098818 filed on Mar. 31, 2006, all of which are incorporated by reference herein in their entirety.

TECHNICAL FIELD

The present invention relates to an optical disk device which reproduces information on an optical disk (including various optical disks for reproduction only and for both recording and reproduction) using a light source such as a laser or which records information on the optical disk, as well as a method of controlling an optical head, and a control device for the optical head.

BACKGROUND ART

In general, optical disk devices converge a light beam spot on an information layer in an optical disk, and receive reflected light from a track or pit formed on the optical disk to read information from the optical disk. At this time, tracking control is performed to allow the light beam spot to follow the track or pit, and focus control is performed to form the light beam spot on the track or pit in an appropriate converged condition.

Figure 10:
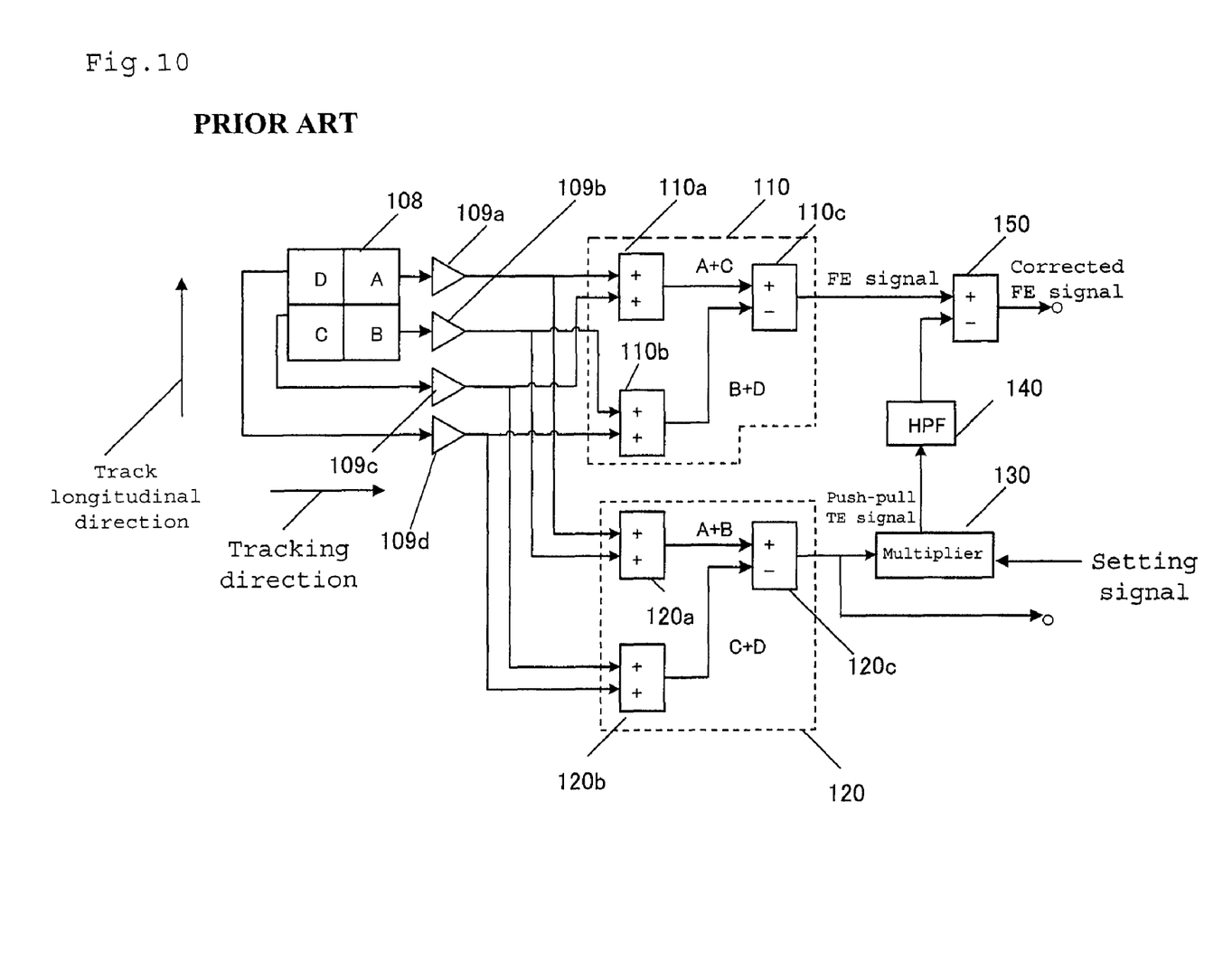
FIG. 10 is a block diagram showing the configuration of a detector and a signal processing section in an optical disk device according to a conventional technique.

Here, FIG. 10 is a block diagram showing the configuration of a detector and a signal processing section in an optical disk device according to a conventional technique; the detector detects a tracking error signal (hereinafter referred to as a TE signal) for tracking control and a focus error signal (hereinafter referred to as an FE signal) for focus control.

As shown in FIG. 10, a detector 108 has four equal detection areas A, B, C, and D into which the detector 108 is divided by cross partition lines. The partition line extending in a lateral direction of FIG. 10 corresponds to a radial direction (hereinafter referred to as a tracking direction) of the optical disk. The partition line extending in a vertical direction of FIG. 10 corresponds to a pit longitudinal direction of the optical disk. Preamplifiers 109a to 109d are electric elements that convert output currents from the areas A to D of the detector 108 into voltages.

An FE signal generating section 110 is an electric circuit that generates the FE signal corresponding to a converged condition of the light beam on the information layer in the optical disk, from output signals from the preamplifiers 109a to 109d by means of what is called an astigmatic focus error detection. A TE signal generating section 120 is an electric circuit that generates the TE signal corresponding to a tracking condition of the light beam on the information layer in the optical disk, from the output signals from the preamplifiers 109a to 109d by means of what is called a push-pull tracking error detection.

The FE signal generating section 110 is composed of an adder 110a that adds the signals from the preamplifiers 109a and 109c together, an adder 110b that adds the signals from the preamplifiers 109b and 109d together, and a subtractor 110c that subtracts an output from the adder 110b from an output from the adder 110a.

Furthermore, the TE signal generating section 120 is composed of an adder 120a that adds the signals from the preamplifiers 109a and 109b together, an adder 120b that adds the signals from the preamplifiers 109c and 109d together, and a subtractor 120c that subtracts an output from the adder 120b from an output from the adder 120a.

With the configuration described above, the optical disk device performs the focus error control and the tracking error control by generating the TE signal and the FE signal from the detected light from the single detector 108.

In the above-described optical disk device, when the light beam spot converged on the information layer in the optical disk traverses the track or pit, optical crosstalk may occur in which the TE signal leaks into the FE signal corresponding to the converged condition of the light beam spot.

As described above, the TE signal generating section 120 detects the TE signal using the push-pull tracking error detection. However, an adjustment residual or the like in the detector 108 for focus detection may cause mixture of a push-pull component (the amount of unbalance between both light receiving sections A and B and both the light receiving sections C and D of the detector 108).

When the optical crosstalk occurs, the optical beam spot is deflected in a direction perpendicular to the information layer in the optical disk (this direction is hereinafter referred to as a focus direction) owing to the focus control. If the deflection is significant, the focus control may fail.

To prevent such a failure in focus control caused by optical crosstalk, the optical disk device shown in FIG. 10 carries out signal processing on the basis of a configuration described below. That is, the amount of TE signal leaking into the FE signal while the tracking control is off is predetermined in the form of a setting signal. A multiplier 130 operating on the basis of the setting signal performs multiplication by a gain corresponding to the leakage amount to adjust the level of the TE signal output by the TE signal generating section 120. The signal with the level adjusted is input to a subtractor 150, which subtracts the level-adjusted signal from the FE signal to generate a corrected FE signal with the optical crosstalk corrected. The safety of the focus control is ensured on the basis of the corrected FE signal.

A conventional essential problem with the push-pull tracking error detection, used to detect the TE signal, is that a lens shift may cause offset. For example, in a lens shift condition in which an objective lens is shifted in a direction orthogonal to the optical axis of the light beam, return light of the light beam reflected by the information layer in the optical disk is received at a position shifted from the center of a light receiving surface of the detector 108. As a result, offset occurs in the TE signal.

When the lens shift has thus caused the offset in the TF signal, the corrected FE signal, utilizing the TE signal, also suffers the offset. This means that even though the light beam is in focus with respect to the information layer, the corrected FE signal has a value other than 0.

The focus control using the corrected FE signal with the offset makes the light beam out of focus with respect to the information layer. The recording and reproducing performance of the optical disk device is thus degraded.

To prevent the out-of-focus condition based on the erroneous focus control based on the corrected FE signal resulting from the offset of the TE signal, the above-described configuration has a high pass filter (hereinafter referred to as an HPF) 140 succeeding the TE signal generating section 120 and the multiplier 130 (see, for example, Japanese Patent No. 3567639 (for example, pp. 4 to 6)).

A push-pull signal, an output from the multiplier 130, passes through the HPF 140, which then removes a DC component corresponding to the offset. By generating a corrected FE signal on the basis of the TE signal with the DC component removed, the optical crosstalk can be, corrected with the possible out-of-focus condition prevented.

On the other hand, optical disks have been improved so as to increase the density and capacity thereof. The development of the optical disks started with CDs (Compact Discs) mainly intended to record music, text information, and the like and proceeded to DVDs (hereinafter referred to as DVDs) intended to record large-capacity information such as motion pictures. In recent years, Blu-ray discs (hereinafter referred to as BDs) with a further increased recording density have been proposed.

In particular, high-density optical disks typified by the BDs, next-generation disks, allow information to be recorded thereon at a higher density than optical disks conforming to conventional standards. Thus, the high-density optical disks involve a larger amount of optical crosstalk components contained in the reflected light from the information layer than the disks conforming to conventional standards, such as the DVDs.

Consequently, to allow the above-described conventional optical disk device to obtain the corrected FE signal corresponding to the optical crosstalk, it is important that the multiplier 130 accurately sets the gain based on the amount of leakage based on the TE signal. Moreover, the offset component contained in the TE signal needs to be reliably removed in order to accurately set the gain in the multiplier 130.

However, the present inventors have found that the following problems may occur if the high-density disk such as the BD is used in the above-described conventional optical disk device.

That is, if the HPF 140 is used to remove the DC component containing the offset component resulting from the lens shift, the frequency characteristic of the HPF 140 attenuates the offset component of the TE signal. However, the phase characteristic of a low frequency region inherently contained in the TE signal varies near the cutoff frequency of the HPF 140.

In this case, in the corrected FE signal, the phase characteristic of the low frequency region varies. Thus, disadvantageously, the optical crosstalk fails to be optimally corrected, resulting in an increase in power consumption and unstable focus control.

This problem is significant when the TE signal varies at low frequencies as in the case of tracking pull-in. However, in the high-density disk such as the BD, which involves frequent tracking in the same information layer and frequent interlayer movement as occurs in multiple information layers, the TE signal varies at low frequencies far more frequently than in the conventional optical disks. Thus, the presence and removal of the offset contained in the TE signal is an unignorable problem for the focus control involving the optical crosstalk correction.

The present invention has been made to solve these problems, and provides an optical disk device and the like which can accurately perform the optical crosstalk correction while dealing with the possible offset component in the tracking error signal.

DISCLOSURE OF THE INVENTION

The 1$^{st}$ aspect of the present invention is an optical disk device comprising:
a light beam emitting section emitting a light beam;
a light beam converging section converging the light beam on an information layer in an optical disk having a mark or a pit;
a moving section moving the light beam converging section;
a light receiving section receiving reflected light from the information layer in the optical disk, the light receiving section having a plurality of light receiving areas;
a tracking error detecting section detecting misalignment between a light spot formed on the information layer by the light beam and the mark or pit, on the basis of signals from predetermined ones of the light receiving areas of the light receiving section;
a focus error detecting section detecting level of convergence of the light beam on the information layer on the basis of signals from predetermined ones of the light receiving areas of the light receiving section;
a correcting section using an output from the tracking error detecting section to correct a signal output by the focus error detecting section; and
a focus control section controlling the moving section so that the light beam converges on the information layer, on the basis of a signal from the correcting section,
wherein the tracking error detecting section detects the misalignment on the basis of phase information obtained from the signals received from the predetermined light receiving areas, and
the correcting section performs a correcting operation of removing a signal component from the predetermined light receiving areas of the light receiving section which component is used by the tracking error detecting section, the signal component being contained in the signals from the predetermined light receiving areas of the light receiving section which signals are used by the focus error detecting section, the signal component corresponding to optical crosstalk.

The 2$^{nd}$ aspect of the present invention is the optical disk device according to the 1$^{st}$ aspect of the present invention, further comprising an interlayer movement control section which, when the optical disk has a plurality of the information layers, controls the moving section so that a convergent point of the light beam moves from any of the information layers to another of the information layers, and
wherein the correcting section performs the correcting operation on the basis of an operation of the interlayer movement control section.

The 3$^{rd}$ aspect of the present invention is the optical disk device according to the 2$^{nd}$ aspect of the present invention, wherein the interlayer movement control section has a determining section determining a polarity of the optical crosstalk in the source information layer from which the light beam is moved and the destination information layer to which the light beam is moved, and
if a result of the determination by the determining section indicates that the polarity of the optical crosstalk differs between the source information layer and the destination layer, the correcting operation is not performed at least during the interlayer movement.

The 4$^{th}$ aspect of the present invention is the optical disk device according to the 3$^{rd}$ aspect of the present invention, wherein the determining section determines a polarity of the mark or the pit on each of the information layers in the optical disk, and if the polarity of the mark or the pit differs between the source information layer and the destination information layer, the determining section determines that the polarity of the optical crosstalk differs between the source information layer and the destination information layer.

The 5th aspect of the present invention is the optical disk device according to the 2nd aspect of the present invention, wherein the correcting section performs the correcting operation by changing a gain for the correction on the basis of a setting specified for each of the information layers.

The 6th aspect of the present invention is the optical disk device according to the 5th aspect of the present invention, further comprising a storage section storing the setting for each of the information layers.

The 7th aspect of the present invention is the optical disk device according to the 3rd aspect of the present invention, wherein the correcting section does not perform the correcting operation during the interlayer movement if the result of the determination fails to be obtained from the determining section.

The 8th aspect of the present invention is the optical disk device according to the 7th aspect of the present invention, wherein the correcting section compares amplitude of a signal component from the predetermined light receiving areas of the light receiving section which component is used by the tracking error signal with amplitude of the focus error signal observed after the correcting operation, and according to a result of the comparison, changes the polarity of the gain for the correction.

The 9th aspect of the present invention is a method of controlling an optical head comprising a light beam emitting section emitting a light beam, a light beam converging section converging the light beam on an information layer in an optical disk having a mark or a pit, a moving section moving the light beam converging section, and a light receiving section receiving reflected light from the information layer in the optical disk, the light receiving section having a plurality of light receiving areas, the method comprising:

a tracking error detecting step of detecting misalignment between a light spot formed on the information layer by the light beam and the mark or pit, on the basis of signals from predetermined ones of the light receiving areas of the light receiving section;

a focus error detecting step of detecting level of convergence of the light beam on the information layer on the basis of signals from predetermined ones of the light receiving areas of the light receiving section;

a correcting step of using an output obtained in the tracking error detecting step to correct a signal obtained in the focus error detecting step; and a focus control step of controlling the moving section so that the light beam converges on the information layer, on the basis of a signal obtained in the correcting step, wherein the tracking error detecting step detects the misalignment on the basis of phase information obtained from the signals received from the predetermined light receiving areas, and the correcting step performs a correcting operation of removing a signal component from the light receiving areas of the light receiving step of which component is used in the tracking error detecting step, the signal component being contained in the signals from the predetermined light receiving areas of the light receiving step of which signals are used in the focus error detecting step, the signal component corresponding to optical crosstalk.

The 10th aspect of the present invention is a control device for an optical head comprising a light beam emitting section emitting a light beam, a light beam converging section converging the light beam on an information layer in an optical disk having a mark or a pit, a moving section moving the light beam converging section, and a light receiving section receiving reflected light from the information layer in the optical disk, the light receiving section having a plurality of light receiving areas, the device comprising:

a tracking error detecting section detecting misalignment between a light spot formed on the information layer by the light beam and the mark or pit, on the basis of signals from predetermined ones of the light receiving areas of the light receiving section;

a focus error detecting section detecting level of convergence of the light beam on the information layer on the basis of signals from predetermined ones of the light receiving areas of the light receiving section;

a correcting section using an output from the tracking error detecting section to correct a signal output by the focus error detecting section; and a focus control section controlling the moving section so that the light beam converges on the information layer, on the basis of a signal from the correcting section, wherein the tracking error detecting section detects the misalignment on the basis of phase information obtained from the signals received from the predetermined light receiving areas, and the correcting section performs a correcting operation of removing a signal component from the predetermined light receiving areas of the light receiving section which component is used by the tracking error detecting section, the signal component being contained in the signals from the predetermined light receiving areas of the light receiving section which signals are used by the focus error detecting section, the signal component corresponding to optical crosstalk.

ADVANTAGES OF THE INVENTION

The present invention described above enables the optical crosstalk correction to be accurately performed while dealing with the possible offset component in the tracking error signal.

DESCRIPTION OF SYMBOLS

100 Optical head
101 Light source
102 Collimator lens
103 Polarizing beam splitter
104 Quarter wavelength plate
105 Objective lens
106 Optical disk
107 Focusing lens
108 Detector
160 Actuator
201 Preamplifier
202 Focus error (FE) signal generating section
203 Phase difference tracking error (DPDTE) signal generating section
204 Microcomputer
205 Optical crosstalk correcting section
205a Multiplier
205b Switch
205c Subtractor
206 Focus control section
207 Switch
208 Interlayer movement signal generating section
209 Focus driving section
210 Memory
211 Crosstalk measuring section

BEST MODE FOR CARRYING OUT THE INVENTION

Embodiments of the present invention will be described below with reference to the drawings.

Embodiment 1

Figure 1:
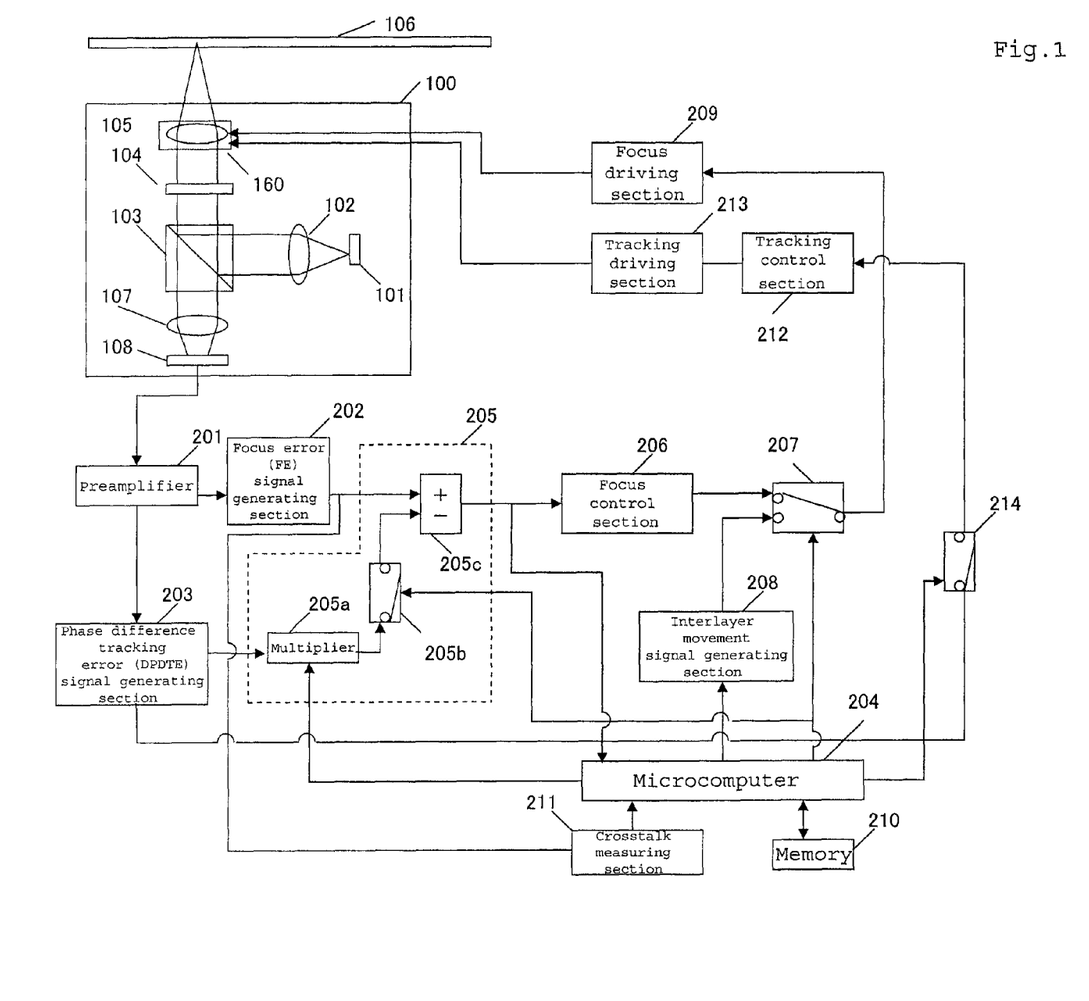
FIG. 1 is a block diagram of an optical disk device according to Embodiment 1 of the present invention.

FIG. 1 is a block diagram showing the configuration of an optical disk device according to Embodiment 1.

In FIG. 1, an optical head 100 is composed of a light source 101, a collimator lens 102, a polarizing beam splitter 103, a quarter wavelength plate 104, an objective lens 105, a focusing lens 107, a detector 108, and an actuator 160.

In the optical head 100, the light source 101 is a semiconductor laser element and outputs a light beam to an information layer in an optical disk 106. The collimator lens 102 converts divergent light emitted by the light source 101 into parallel light. The polarizing beam splitter 103 totally reflects linearly polarized light emitted by the light source 101 and allows the total transmission of linearly polarized light in a direction orthogonal to the linearly polarized light emitted by the light source 101. The quarter wavelength plate 104 is an optical element that converts the transmitted polarized light from circularly polarized light into linearly polarized light or from linearly polarized light into circularly polarized light. The objective lens 105 focuses the light beam on the information layer in the optical disk 106.

Figure 2:
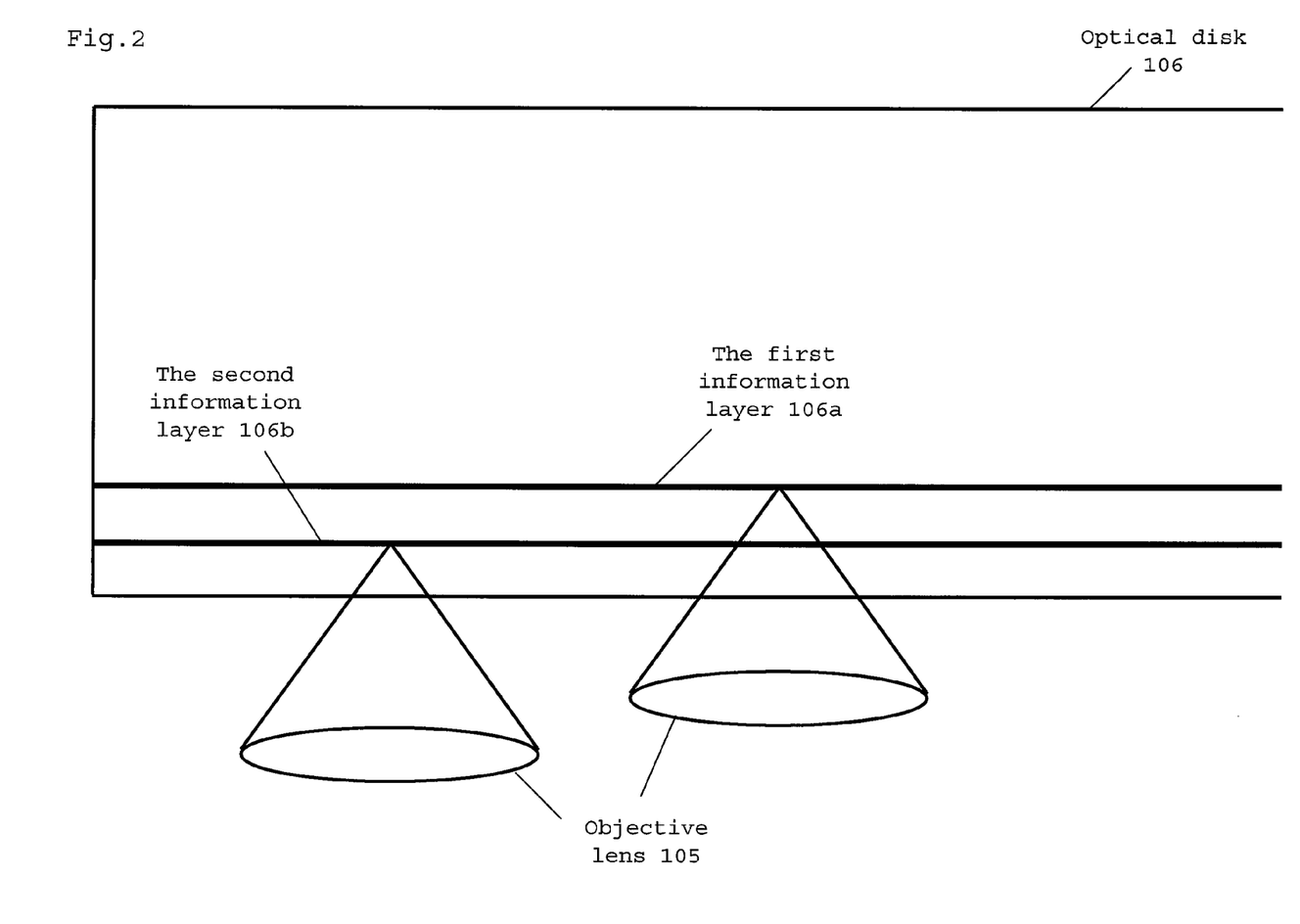
FIG. 2 is a schematic diagram of a two-layer optical disk having two information layers.

As shown in FIG. 2, the optical disk 106 is a multilayer disk having two information layers, a first information layer 106a and a second information layer 106b. Pits are formed on a surface of each of the information layers. Furthermore, the polarity of the pits, that is, the direction of recesses and protrusions formed on the layer, is reversed between the first information layer 106a and the second information layer 106b.

The focusing lens 107 focuses the light beam transmitted through the polarizing beam splitter 103 on a detector 108. The detector 108 is an element that converts the received light into an electric signal and has four separate detection areas as described below.

Furthermore, in a control section of the optical head 100, a preamplifier 201 is an electric element that converts an output current from each of the detection areas of the detector 108 into a voltage. An FE signal generating section 202 is an electric circuit that generates a focus error signal (hereinafter referred to as an FE signal) corresponding to a converged condition of the light beam on the information layer in the optical disk 106, from a plurality of output signals from the preamplifier 201 by means of what is called the astigmatic focus error detection. A DPDTE signal generating section 203 is an electric circuit that generates a phase difference tracking error signal (hereinafter referred to as a DPDTE signal) indicative of the positional relationship between a light spot and the pit on the information layer of the optical disk 106, from the plurality of output signals from the preamplifier 201.

A multiplier 205a is an electric circuit that multiplies the DPDTE signal output by the DPDTE signal generating section 203, by a gain corresponding to a setting signal from a microcomputer 204 to output the resultant signal. A switch 205b is an electric circuit that switches on and off in response to a command signal from the microcomputer 204.

A subtractor 205c is an electric circuit that adds the FE signal output by the FE signal generating section 202 and a signal output by a switch 205b to output the resultant signal. Furthermore, a crosstalk measuring section 211 is an electric circuit that measures the level of optical crosstalk on the basis of a change in the FE signal preceding and following an existence of tracking control described below.

An optical crosstalk correcting section 205 is an electric circuit composed of the multiplier 205a, the switch 205b, the subtractor 205c, and the crosstalk measuring section 211. A focus control section 206 is a circuit that outputs a focus control signal on the basis of a signal output by the subtractor 205c. A switch 207 is an electric circuit that outputs one of the output signal from the focus control section 206 and an output signal from an interlayer movement signal generating section 208 in response to a command signal from the microcomputer 204.

The interlayer movement signal generating section 208 is a circuit outputting a jumper pulse that is a driving pulse moving the light beam spot to a different layer, in response to a command signal from the microcomputer 204. A memory 210 is a storage circuit that stores data. A focus driving section 209 is a circuit that outputs a focus direction actuator driving signal on the basis of the focus control signal output by the switch 207.

Furthermore, a tracking control section 212 is an electric circuit that generates a tracking control signal corresponding to the output of the DPDTE signal generated by the DPDTE signal generating section. A tracking driving section 213 is a circuit that outputs a tracking direction actuator driving signal on the basis of the tracking control signal.

The actuator 160 is a mechanism which, upon receiving the input of a focus direction actuator driving signal, moves the objective lens 105 in a direction perpendicular to the information layer in the optical disk 106 (this direction is hereinafter referred to as a focus direction) and which, upon receiving the input of the tracking direction actuator driving signal, moves the objective lens 105 in a radial direction of the optical disk 106 (this direction is hereinafter referred to as a tracking direction). A switch 214 is an electric circuit that controllably turns on and off the operation of the tracking control section 212 in accordance with a command signal from the microcomputer 204.

Figure 3:
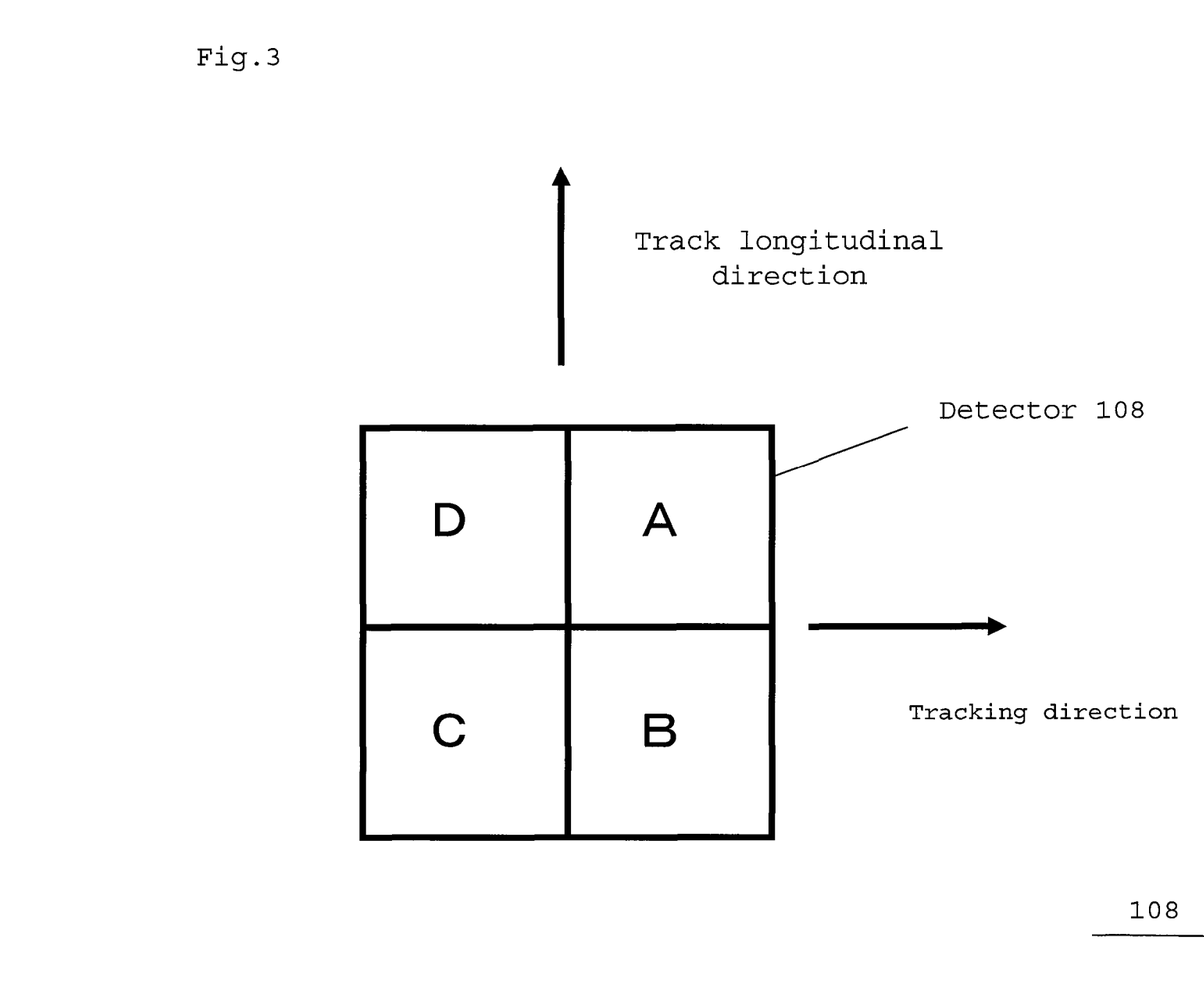
FIG. 3 is a diagram showing the configuration of a detector 108.

Furthermore, FIG. 3 shows a plan view of the detector 108. As shown in FIG. 3, the detector 108 has four equal detection areas A, B, C, and D into which the detector 108 is divided. The partition line in the detector 108 which extends in the lateral direction of FIG. 3 corresponds to the radial direction (hereinafter referred to as the tracking direction) of the optical disk. The partition line in the detector 108 which extends in the vertical direction of FIG. 3 corresponds to a pit longitudinal direction of the optical disk.

Figure 4:
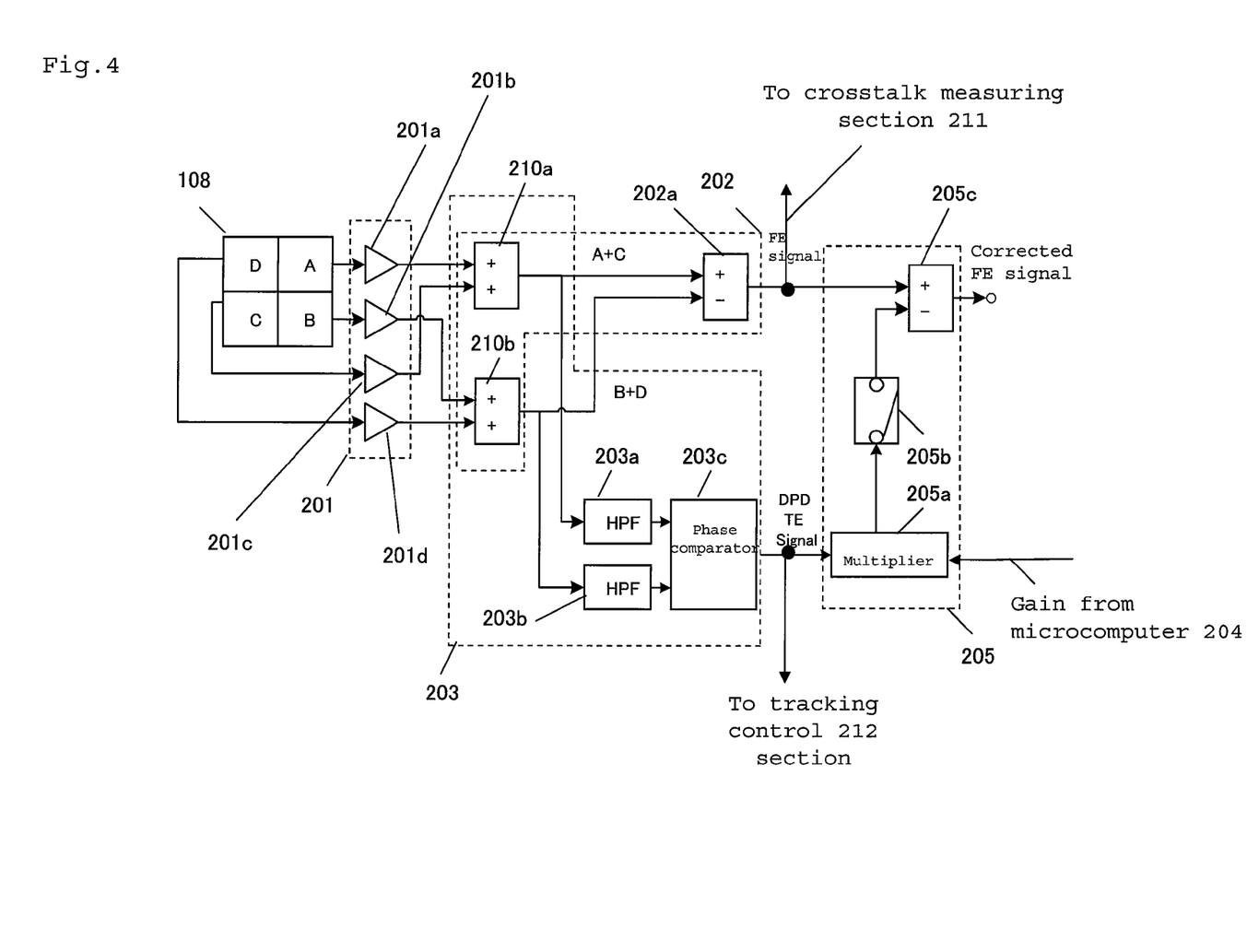
FIG. 4 is a block diagram showing the configuration of an essential part of the optical disk device according to Embodiment 1 of the present invention.

FIG. 4 is a block diagram showing, in further detail, the configuration of the detector 108, the FE signal generating section 202, the DPDTE signal generating section 203, and the optical crosstalk correcting section 205.

As shown in FIG. 4, preamplifiers 201a to 201d are electric elements that convert output currents from the areas A to D of the detector 108 into voltages.

The FE signal generating section 202 is composed of an adder 210a that adds signals from the preamplifiers 201a and 201c together, an adder 210b that adds signals from the preamplifiers 201b and 201d together, and a subtractor 202a that subtracts an output from the adder 210b from an output from the adder 210a.

The DPDTE signal generating section 203 shares the adders 210a and 210b with the FE signal generating section 202, and comprises a high pass filter (hereinafter referred to as an HPF) 203a which allows the output from the adder 210a to pass through, an HPF 203b which allows the output from the adder 210b, and a phase comparator 203c which receives inputs from the HPFs 203a and 203b to compare the phases of the signals to output the comparison result as the DPDTE signal.

In the above-described configuration, the optical head 100 is composed of the light source 101, the collimator lens 102, the polarizing beam splitter 103, the quarter wavelength plate 104, the objective lens 105, the focusing lens 107, the detector 108, and the actuator 160. The light source 101 corresponds to the light beam emitting section according to the present invention. The objective lens 105 corresponds to the light beam converging section according to the present invention. The actuator 160 corresponds to the moving section according to the present invention. Furthermore, the detector 108 corresponds to the light receiving section according to the present invention. The optical head 100 corresponds to the optical head according to the present invention.

On the other hand, the FE signal generating section 202 corresponds to the focus error detecting section. The DPDTE signal generating section 203 corresponds to the tracking error detecting section according to the present invention.

Furthermore, the optical crosstalk correcting section 205, the crosstalk measuring section 211, the microcomputer 204, and the memory 210 correspond to the correcting section according to the present invention.

Furthermore, the focus control section 206, the switch 207, and the focus driving section 209 correspond to the focus control section according to the present invention. Additionally, the microcomputer 204, the interlayer movement signal generating section 208, the switch 207, the switch 214, and the focus driving section 209 correspond to the interlayer movement control section according to the present invention.

Description will be given below of the operation of the optical disk device configured as described above according to Embodiment 1 of the present invention and thus an embodiment of a method of controlling the optical disk device according to the present invention.

A linearly polarized light beam emitted by the light source 101 enters the collimator lens 102, which converts the light beam into parallel light. The light beam changed to the parallel light by the collimator lens 102 enters the polarizing beam splitter 103. The light beam is reflected by the polarizing beam splitter 103. The reflected light beam is then changed to circularly polarized light by the quarter wavelength plate 104.

The light beam changed to the circularly polarized light by the quarter wavelength plate 104 enters the objective lens 105 and is convergingly emitted to the optical disk 106. The light beam reflected by the optical disk 106 is transmitted through the polarizing beam splitter 103 and enters the focusing lens 107. The light beam having entered the focusing lens 107 impinges on the detector 108.

As shown in FIG. 4, the light beam having entered the detector 108 is converted into electric signals by the partition areas A to D. The electric signals resulting from the conversion by the partition areas A to D of the detector 108 are converted into voltages by the preamplifier 201.

As shown in FIG. 4, the signals amplified by the preamplifiers 201a and 201c, constituting the preamplifier 201, are added together by the adder 210a. As a result, the detector 108 outputs one of two diagonal sum signal, that is, a signal (A+C). Furthermore, the signals amplified by the preamplifiers 201b and 201d are added together by the adder 210b. As a result, the detector 108 outputs the other diagonal sum signal, that is, a signal (B+D).

In the FE signal generating section 202, the subtractor 202a subtracts the signal (B+D) from the signal (A+C) to obtain the FE signal. By determining the difference between the diagonal sums of the light receiving signals from the light receiving areas A to D, the level of the convergence of the light beam on the first or second information layer 106a or 106b is obtained as the FE signal on the basis of the astigmatic focus error detection.

On the other hand, in the DPDTE signal generating section 203, the HPFs 203a and 203b remove low frequency components from the signals (A+C) and the signal (B+D), respectively. The resultant signals are input to the phase comparator 203c. The input signals are processed into the DPDTE signal by the phase comparator 203c.

Differential phase detection will be described below taking the present configuration by way of example. When the spot formed on the information layer (first or second information layer 106a or 106b) in the optical disk 106 by the light beam passes over a pit or mark on the information layer, the return light of the light beam is reflected by the information layer. The distribution of the intensity of the return light varies depending on the position of the light beam in the tracking direction. Thus, the difference in phase (this is hereinafter referred to as phase information) between the diagonal sum signals (A+C) and (B+D) both of which is occurred in the detector 108 can be utilized to detect the misalignment between the spot of the light beam and the pit or mark.

In the present embodiment, instead of the diagonal sums, phase information for the adjacent light receiving areas may be detected, such as a comparison between the areas A and D or a comparison between the areas B and C. With the DPDTE signal, in connection with the detection principle thereof, no offset occurs even in a lens shift condition in which the objective lens 105 is shifted in the tracking direction with respect to the optical axis. That is, in the detected signal only the difference in a time axis direction, corresponding to the phase information, is used to generate the signal without using any information contained and relating to an amplitude direction in which offset is added.

The FE signal from the FE signal generating section 202 is used for the correcting operation performed by the optical crosstalk correcting section 205. This will be described below.

The FE signal is input to the crosstalk measuring section 211. The crosstalk measuring section 211 receives the input of the FE signal both while the tracking control is off, that is, while the switch 214 is kept off by the microcomputer 204 to avoid operating the tracking control section 212 and the tracking driving section 213, and while the tracking control is on, that is, while the switch 214 is kept on by the microcomputer 204 to operate the tracking control section 212 and the tracking driving section 213. The crosstalk measuring section 211 thus compares the signal amplitudes of the FE signals obtained in both cases.

The crosstalk measuring section 211 then measures the difference in amplitude resulting from the comparison, as the magnitude of the push-pull signal TE leaking into the FE signal, that is, the leakage level of the optical crosstalk.

The leakage level, an output from the crosstalk measuring section 211, is input to the microcomputer 204. The microcomputer 204 then generates a gain setting signal corresponding to the leakage level and outputs the resultant signal to the multiplier 205a. The gain setting signal from the microcomputer 204 is input to the multiplier 205a, in which the corresponding gain is set.

Then, the DPDTE signal from the DPDTE signal generating section 203, which is obtained through the multiplication by the gain performed by the multiplier 205a, is output to the subtractor 205c via the switch 205b.

The FE signal from the FE signal generating section 202 and the signal output by the switch 205b are calculated by the subtractor 205c.

The FE signal input directly to the subtractor 205c by the FE signal generating section 202 contains a signal component of the push-pull TE signal corresponding to the optical crosstalk. However, the DPDTE signal subjected to the multiplication by the gain by means of the multiplier 205a is subtracted as a signal corresponding to the above-described signal component. As a result, the corrected FE signal is output which has the possible leakage component of the optical crosstalk corrected.

The corrected FE signal is input to the focus control section 206 and passes through a phase compensation circuit and a low frequency compensation circuit which are composed of, for example, digital filters based on digital signal processors (hereinafter referred to as DSPs). The corrected FE signal thus changes to a focus driving signal. The focus driving signal from the focus control section 206 is input to the focus driving section 209 via the switch 207, where the signal is amplified. The amplified focus driving signal is then output to the actuator 160, which drives the objective lens 105 in the focus direction.

Thus, the focus control is achieved such that the light beam is in a predetermined converged condition on the information layer (first or second information layer 106a or 106b) in the optical disk 106.

The above-described operation is characterized in that the DPDTE signal, not affected by the lens shift, is used as a tracking control signal to correct the optical crosstalk leaking into the FE signal, to prevent the corrected FE signal from containing the offset component.

Figure 5:
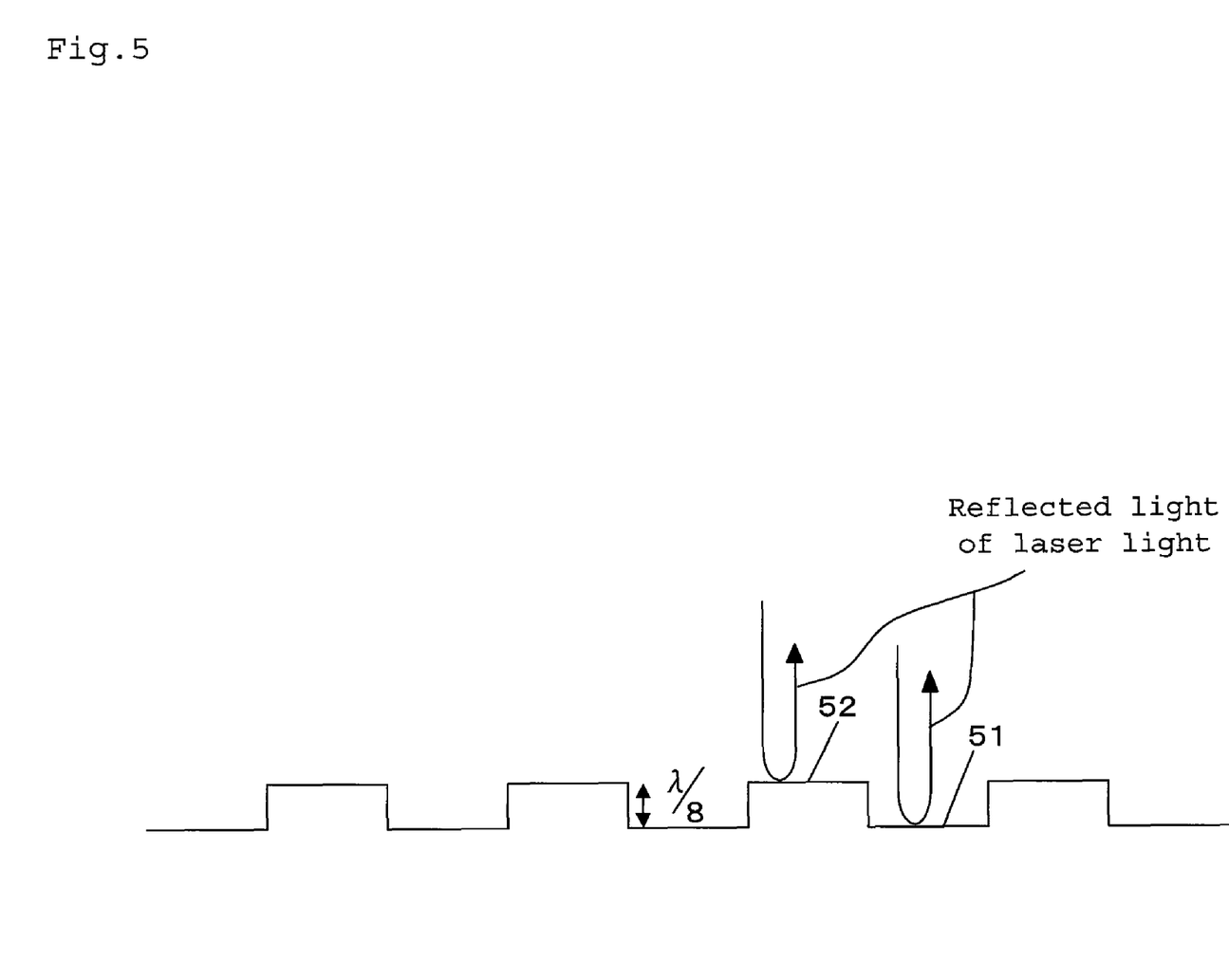
FIG. 5 is a diagram illustrating the operational principle of the optical disk device according to Embodiment 1 of the present invention.

Here, the DPDTE signal can be used for the following reason. That is, in high-density optical disks such as BDs, the depth of the pit is one-eighth of the wavelength of laser light. With this disk configuration, a phase difference corresponding to a quarter of the wavelength of laser light occurs between reflected light from a reflection surface 51 of a pit shown in FIG. 5 and reflected light from an information layer 52. Thus, tracking error detection based on a differential phase detection method can be used in addition to tracking error detection based on the push-pull tracking error detection, which is otherwise used.

As described above, according to the present embodiment, even if the return light of the light beam reflected by the information layer is received at a position shifted from the center of a light receiving surface of the detector 108, the appropriate optical crosstalk correction can be performed to reduce power consumption and achieve stable focus control.

Furthermore, according to the configuration of the present embodiment, since the DPDTE signal is used as the TE signal, the offset based on the lens shift is inherently inhibited. This eliminates the need for a large-capacity HPF required when the push-pull TE signal is used, to remove a possible DC component of the TE signal resulting from the lens shift. The problem with the phase in the low frequency region associated with the HPF can also be solved. In the above-described configuration, the DPDTE signal generating section 203 comprises the pair of HPFs 203a and 203b. However, like signal components not removed by these filters, the amplitude information contained in signal components removed by the filters is not utilized in the phase comparator 203c. Consequently, the HPFs 203a and 203b can have a smaller capacity and simpler configuration than an offset HPF. Moreover, the HPFs 203a and 203b may be omitted.

Embodiment 2

An optical disk device according to Embodiment 2 of the present invention relates to the optical disk device according to Embodiment 1 which corrects the optical crosstalk taking interlayer movement of the optical disk 106 into account. Since Embodiment 2 has the same configuration as that of Embodiment 1, the basic description of the components of Embodiment 1 references FIG. 1 and other figures.

The optical disk device according to Embodiment 1 can deal with the multilayer optical disk having the first information layer 106a and the second information layer 106b. However, the appropriate operation of this optical disk device may fail to be ensured depending on the configuration of each information layer.

Figure 6:
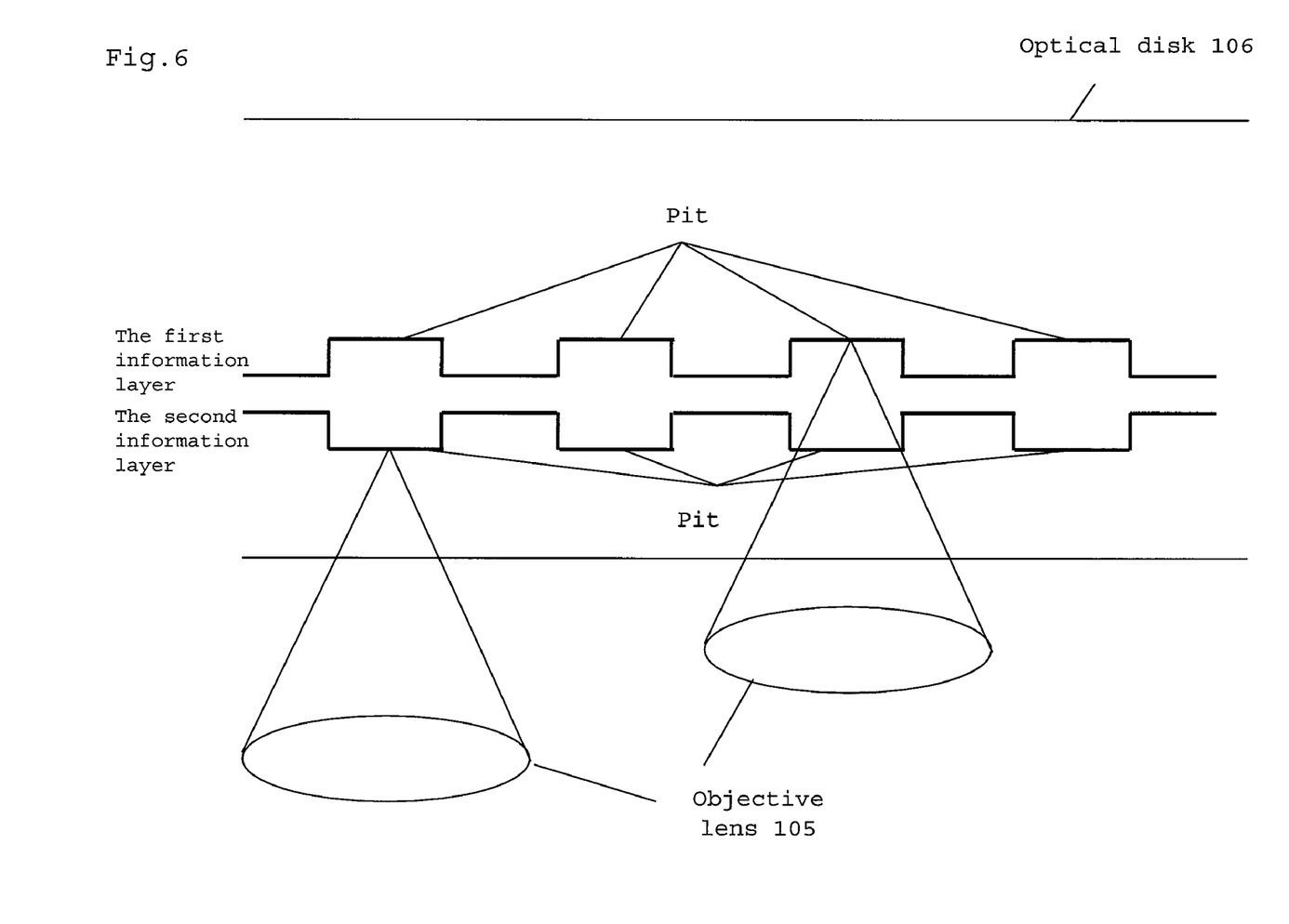
FIG. 6 is a diagram showing the configuration of an optical disk 106 that is a two-layer optical disk having inverted pit polarities and which is intended for an optical disk device according to Embodiment 2 of the present invention.

FIG. 6 is a sectional view of an example of the configuration of such a multilayer optical disk, that is, a two-layer optical disk in which the polarity of pits on a first information layer 106a is reverse to that of pits on a second information layer 106b, that is, the direction in which the recesses and protrusions of the pits are formed on the first information layer 106a is opposite to that on the second information layer 106b.

With reference to FIG. 7, description will be given of the polarity of the leakage component into the FE signal and the polarity of the DPDTE signal observed if the focus control of the optical disk device according to Embodiment 1 is performed on the information layers in the two-layer optical disk.

Figure 7A:
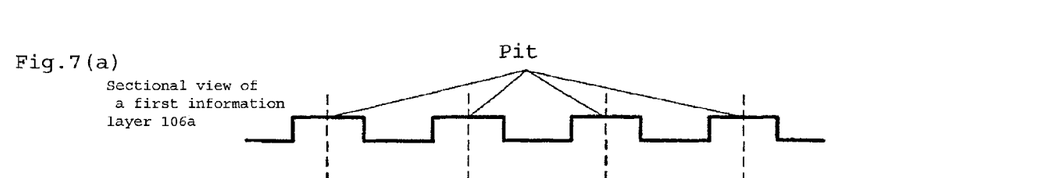
FIG. 7(a) is a sectional view of a first information layer 106a, FIG. 7(b) is a diagram showing the waveform of a leakage component that may be generated when a light beam spot traverses a pit in the first information layer 106a, FIG. 7(c) is a diagram showing the waveform of a DPDTE signal generated when the light beam spot traverses the pit in the first information layer 106a, FIG. 7(d) is a sectional view of a second information layer 106b.
Figure 7B:
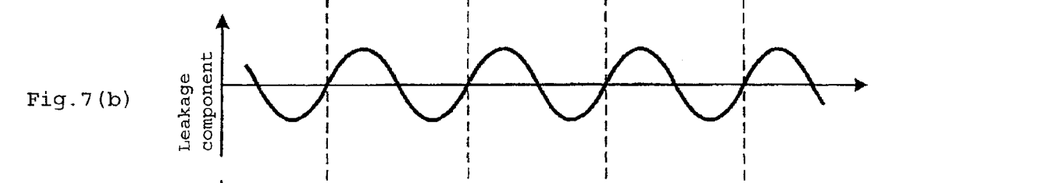
Figure 7C:
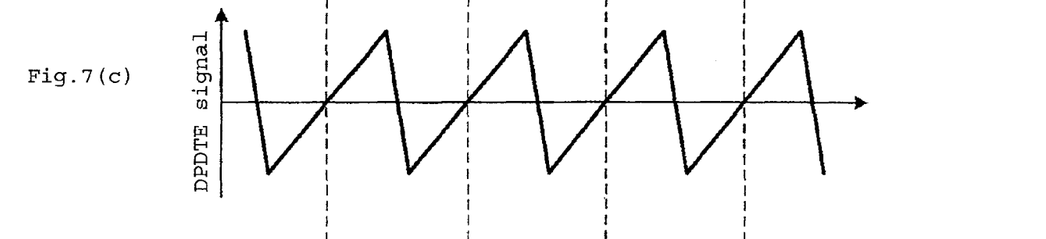

FIG. 7(a) is a sectional view of the first information layer 106a. FIGS. 7(b) and 7(c) show the waveforms of the leakage component and DPDTE signal generated if the light beam spot traverses a pit on the first information layer 106a.

Figure 7D:
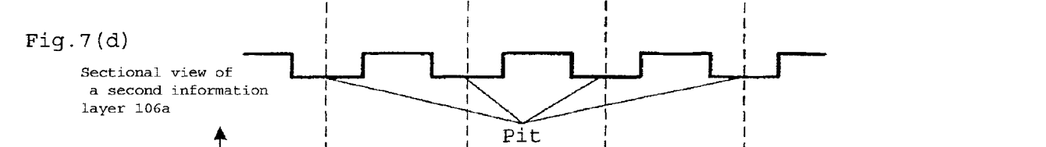
Figure 7E:
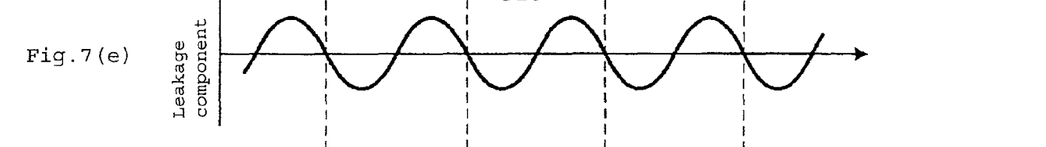
FIG. 7(e) is a diagram showing the waveform of a leakage component that may be generated when a light beam spot traverses a pit in the second information layer 106b.
Figure 7F:
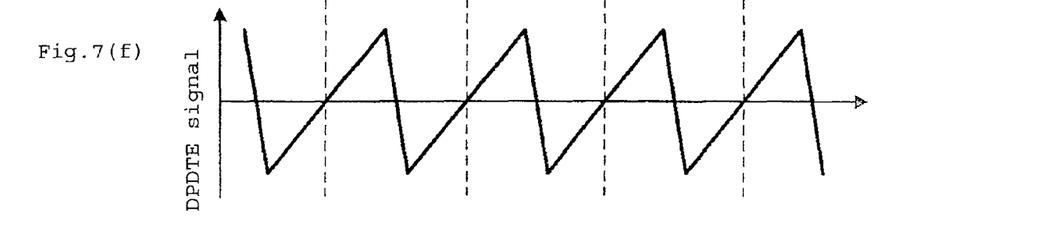
FIG. 7(f) is a diagram showing the waveform of a DPDTE signal generated when the light beam spot traverses the pit in the second information layer 106b.

Furthermore, FIG. 7(d) is a sectional view of the second information layer 106b, having a pit polarity reverse to that of the first information layer 106a. FIGS. 7(e) and 7(f) show the waveforms of the leakage component and DPDTE signal generated if the light beam spot traverses a pit on the second information layer 106b.

As shown in FIGS. 7(a) and 7(d), the pit polarities of the first information layer 106a and the second information layer 106b are reversed. Thus, as shown in FIGS. 7(b) and 7(e), the leakage component is reversed between the first information layer 106a and the second information layer 106b. On the other hand, as shown in FIGS. 7(c) and 7(f), the DPDTE signal is prevented, on the basis of the detection principle thereof, from being reversed between the first information layer 106a and the second information layer 106b, having the reverse pit polarities.

Thus, if the same polarity of the gain set in the multiplier 205a and required to correct the optical crosstalk is applied to all the information layers in the optical disk 106, then since in the first information layer 106a, the leakage component and the DPDTE signal are in phase, the level-adjusted DPDTE signal corrects the optical crosstalk. However, since in the second information layer 106b, the leakage component and the DPDTE signal have opposite phases, the level-adjusted DPDTE signal reversely corrects and amplifies the optical crosstalk. This disadvantageously increases the power consumption and makes the focus control unstable, preventing the appropriate operation from being ensured.

The present embodiment deals with this case and achieves optical crosstalk correction that copes with the information layers in the multilayer optical disk as well as interlayer movement.

Figure 8:
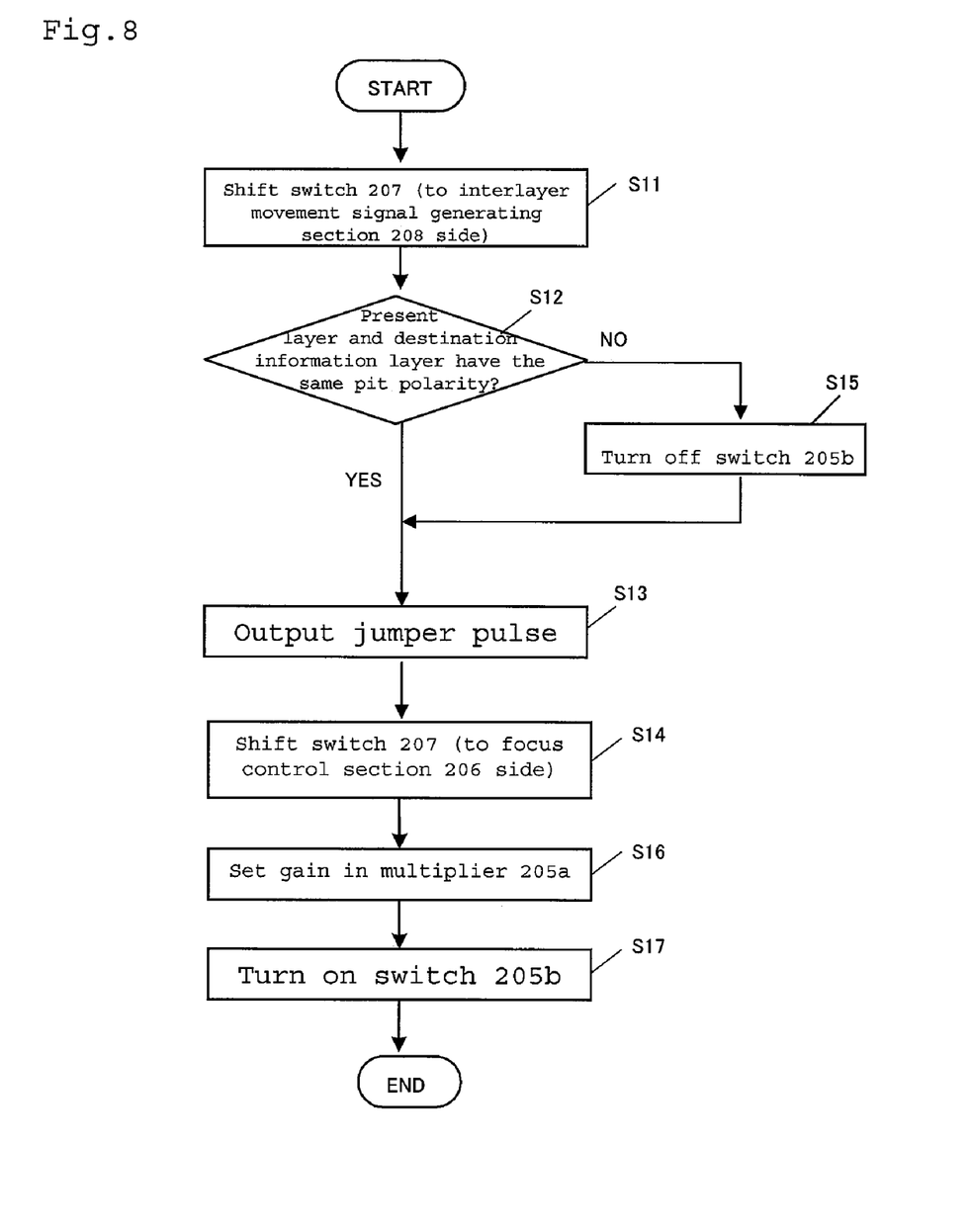
FIG. 8 is a diagram showing a flowchart showing a procedure of switching an optical crosstalk correcting operation during and after interlayer movement according to Embodiment 2 of the present invention.

With reference to FIG. 8, description will be given of switching of the optical crosstalk correcting operation during and after the interlayer movement in the optical disk device according to Embodiment 2. FIG. 8 is a flowchart showing the switching of the optical crosstalk correcting operation during and after the interlayer movement.

The flowchart in FIG. 8 will be described below. When the interlayer movement is performed, first, the switch 207 otherwise held on the focus control section 206 side is shifted to the interlayer movement signal generating section 208 side in response to a command signal from the microcomputer 204 (S11). The focus control of the present information layer is turned off.

Then, the microcomputer 204 determines whether or not the pit polarity of the present information layer is the same as that of a destination information layer (S12). The polarities can be predetermined, for example, on the basis of the results of reading of disk information from a control data area of the optical disk before the interlayer movement. In the BD, the control area is provided in a layer located at a depth of 100 μm from the surface on which the light beam impinges. The polarities of the information layers can be written to the control area. Here, the microcomputer 204 corresponds to the determining section according to the present invention.

Upon determining the polarities to be the same, the microcomputer 204 gives a command signal to the interlayer movement signal generating section 208, which then outputs a jump pulse (S13). The jump pulse output by the interlayer movement signal generating section 208 is input to the focus driving section 209. The focus driving section 209 then amplifies the jump pulse and outputs the amplified jump pulse to the actuator 160.

The actuator 160 moves the objective lens 105 toward the destination information layer. In conjunction with the movement of the objective lens 105, the light beam spot moves to the vicinity of the destination information layer.

Then, the switch 207 is shifted from the interlayer movement signal generating section 208 side to the focus control section 206 side (S14). This allows the focus control to be performed on the destination information layer, and the interlayer movement is completed.

On the other hand, in step S12, upon determining that the information layers have the different pit polarities, the microcomputer 204 gives a command signal to turn off the switch 205b (S15). Thus, the optical crosstalk correction is not performed. Subsequently, steps S13 and S14 are carried out to complete the interlayer movement.

Then, the microcomputer 204 outputs the gain set value stored in the memory 210 and required to correct the possible leakage component of the optical crosstalk in the destination information layer, to the multiplier 205a as a set signal. The multiplier 205a is set for the gain required to correct the possible leakage component of the optical crosstalk leaking into the FE signal in the destination information layer (S16).

Then, a command signal from the microcomputer 204 turns on the switch 205b (S17). The multiplier 205a multiplies the TE signal by the gain and outputs the resultant signal to the subtractor 205c. The FE signal from the FE signal generating section 202 and the output signal from the switch 205b are added together by the subtractor 205c. The subtractor 205c outputs the corrected FE signal with the possible leakage component of the optical crosstalk corrected, which leaks into the FE signal in the destination information layer.

With the above-described configuration, the appropriate gain for the information layer corresponding to the destination of the interlayer movement is set in the multiplier 205a. Thus, the focus control can be performed by using the corrected FE signal with the possible leakage component of the optical crosstalk in the information layer corresponding to the destination of the interlayer movement appropriately corrected.

Furthermore, if the light beam spot moves to the information layer with the different pit polarity, the interlayer movement can be achieved without the optical crosstalk correction. This enables the accurate interlayer movement with the power consumption reduced.

Thus, if the polarity of the TE signal is the same and the polarity of the leakage component differs between the source information layer from which the light beam spot is moved and the destination information layer to which the light beam spot is moved, inappropriate optical crosstalk corrections that may otherwise be performed immediately after the interlayer movement can be prevented. Consequently, the power consumption can be reduced, and the stability of the focus control can be improved. As a result, the recording and reproducing performance of the optical disk device can be improved.

Furthermore, the optimum optical crosstalk correction can be achieved after the interlayer movement. Consequently, the power consumption can be reduced, and the stability of the focus control can be improved. As a result, the recording and reproducing performance of the optical disk device can be improved.

For example, if the interlayer movement is performed while the optical disk device is being started, pit polarity information may fail to be obtained, that is, the disk information may fail to be read from the control data area, depending on timing for performing the interlayer movement. This may prevent the determination from being made.

Figure 9:
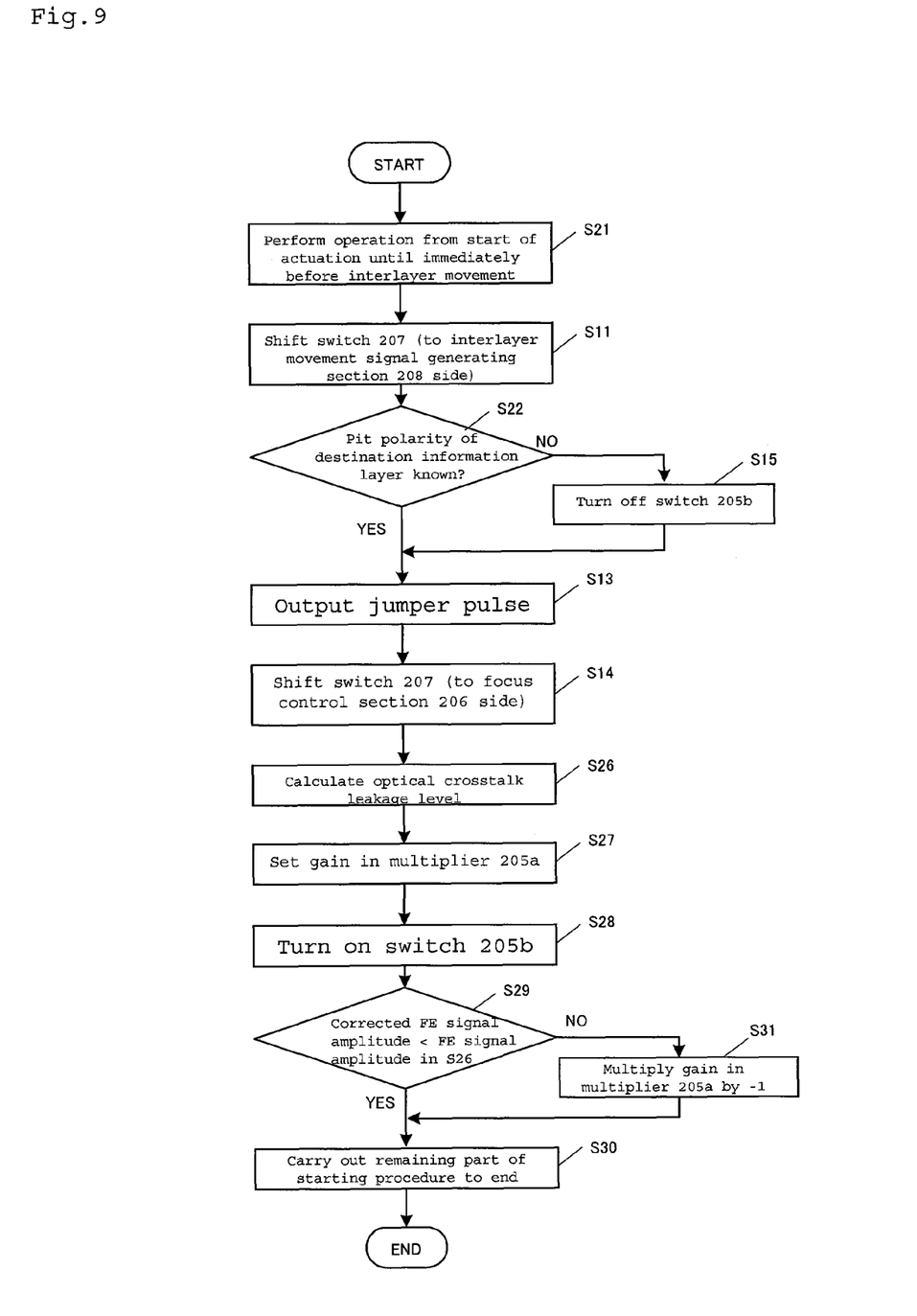
FIG. 9 is a diagram showing a flowchart showing another example of the procedure of switching the optical crosstalk correcting operation during and after the interlayer movement while the device is being started, according to Embodiment 2 of the present invention.

Switching of the optical crosstalk correcting operation according to the interlayer movement in this case will be described with reference to FIG. 9. FIG. 9 is a flowchart showing the procedure of switching the optical crosstalk correcting operation between the source information layer and the destination information layer during the start of the device. The same steps as those in FIG. 8 are denoted by the same reference numerals and will not be described below.

First, the starting of the device is performed from the start of actuation until immediately before the start of the interlayer movement (S21). Then, step S11 is carried out to perform the interlayer movement. Then, the microcomputer 204 determines whether or not the pit polarity of the destination information layer is known (S22). If the microcomputer 204 determines that the pit polarity is known, steps S13 and S14 are carried out to complete the interlayer movement.

Furthermore, in step S22, upon determining that the pit polarity is unknown, the microcomputer 204 carries out step S15 to temporarily stop the optical crosstalk correcting operation. Subsequently, steps S13 and S14 are carried out to complete the interlayer movement.

Then, the optical crosstalk correcting section 205 performs the optical crosstalk correction on the destination information layer (S26). The gain required to correct the possible leakage component of the optical crosstalk leaking into the FE signal in the destination information layer is temporarily set in the multiplier 205a (S27).

Then, a command signal from the microcomputer 204 turns on the switch 205b. The multiplier 205a multiplies the TE signal by the gain and outputs the resultant signal to the subtractor 205c. The FE signal from the FE signal generating section 202 and the output signal from the switch 205b are added together by the subtractor 205c. The optical crosstalk correcting section 205 outputs the corrected FE signal with the possible leakage component of the optical crosstalk corrected, which leaks into the FE signal in the destination information layer.

In steps S27 and S28 described above, the pit polarity is unknown before or after the movement between the information layers is performed. Thus, whether or not the corrected FE signal has a polarity suitable for the destination information layer is unknown. Consequently, the corrected FE signal is input to the microcomputer 204, which compares the amplitude of the corrected FE signal with the amplitude of the optical crosstalk leakage level calculated in step S26 (S29). If the amplitude of the corrected FE signal is smaller than that of the optical crosstalk leakage level, the corrected FE signal has a normal polarity. Thus, subsequently, the device starting is performed to the end (S30).

On the other hand, if the amplitude of the corrected FE signal is larger than that of the optical crosstalk leakage level, the corrected FE signal has the opposite polarity. Thus, the microcomputer 204 sets a level obtained by multiplying the currently set level by −1, in the multiplier 205a to reverse the polarity of the corrected FE signal (S31). The device starting is then performed to the end (S30).

With the above-described configuration, even if during the device starting, the light beam spot moves to the information layer with the unknown pit polarity, the interlayer movement can be achieved without the need for the optical crosstalk correction. In addition, the appropriate optical crosstalk correction is performed on the destination information layer depending on the pit polarity of the information layer. Thus, the focus control can be performed using the corrected FE signal with the possible leakage component appropriately corrected.

Therefore, even if during the device starting, the light beam spot moves to the information layer with the unknown pit polarity, the inappropriate optical crosstalk corrections that may otherwise be performed immediately after the interlayer movement can be prevented. Consequently, the power consumption can be reduced, and the stability of the focus control can be improved. As a result, the recording and reproducing performance of the optical disk device can be improved.

Furthermore, during the device starting, the optimum optical crosstalk correction can be achieved after the interlayer movement. Consequently, the power consumption can be reduced, and the stability of the focus control can be improved. As a result, the recording and reproducing performance of the optical disk device can be improved.

In the flowchart for the device starting in FIG. 8, the optical crosstalk correction is performed after the interlayer movement as step S26. However, if the gain required to correct the possible leakage component of the optical crosstalk in the destination information layer is known, for example, if the results of optical crosstalk corrections during previous device starting are saved to the memory 210, similar effects can be produced by setting the gain in the multiplier 205a to a desired value.

In particular, since the modulation level of the TE signal varies between the information layers in the multilayer disk, the amount of optical crosstalk also varies between the information layers. Thus, the gain required to correct the optical crosstalk needs to have a value optimized for all the information layers. Accordingly, the memory 210 is preferably used. However, with the memory 210 omitted, the gain may be sequentially set for each correcting operation. Therefore, the device can be simplified, and the costs of the device can be reduced.

Furthermore, in the above-described embodiments, the correcting section uses the scheme of comparing the FE signal amplitude observed while the tracking control is on with the FE signal amplitude observed while the tracking control is off to determine the possible leakage level of the optical crosstalk leaking into the FE signal, and setting the gain corresponding to the level, in the multiplier 205a. However, the optical crosstalk correcting scheme is not particularly limited.

Furthermore, in the above-described embodiments, the results of reading of the disk information from the control data area of the optical disk are used to determine the pit polarity of each of the information layers for the interlayer movement. However, the determination method is not limited to this scheme. As seen in step S29 in the flowchart in FIG. 9, the temporary correcting operation may be performed to compare the amplitude of the corrected FE signal with the amplitude of the optical crosstalk leakage level for determination.

Furthermore, in the above description, the present invention is the optical disk device using the optical disk 106 that is a two-layer optical disk. However, the present invention may relate to an optical disk device using a single-layer optical disk or an optical disk with at least three layers. Furthermore, in the above description, pits are formed on the surface of each of the information layers in the optical disk 106. However, marks may be formed on the surface of the information layer. Here, the mark or pit means a variation in physical shape on the information layer which enables tracking errors to be detected on the basis of the phase difference method. The present invention is not limited to the specific configuration of the mark or pit.

Furthermore, in the above description, the present invention is the optical disk device. However, the present invention may be implemented as a control device for the optical head 100.

INDUSTRIAL APPLICABILITY

The optical device, the method of controlling the optical head, and the control device for the optical head according to the present invention are effective for accurately performing the optical crosstalk correction while dealing with the possible offset component of the tracking error signal, and are useful for improving the recording and reproducing performance of the optical disk device.

The invention claimed is:

1. An optical disk device comprising:
a light beam emitting section emitting a light beam;
a light beam converging section converging the light beam on an information layer in an optical disk having a mark or a pit;
a moving section moving the light beam converging section;
a light receiving section receiving reflected light from the information layer in the optical disk, the light receiving section having a plurality of light receiving areas;
a tracking error detecting section detecting misalignment between a light spot formed on the information layer by the light beam and the mark or pit, on the basis of signals from predetermined ones of the light receiving areas of the light receiving section;
a focus error detecting section detecting level of convergence of the light beam on the information layer on the basis of signals from predetermined ones of the light receiving areas of the light receiving section;
a correcting section using an output from the tracking error detecting section to correct a signal output by the focus error detecting section; and
a focus control section controlling the moving section so that the light beam converges on the information layer, on the basis of a signal from the correcting section,
wherein the tracking error detecting section detects the misalignment on the basis of phase information obtained from the signals received from the predetermined light receiving areas, and
the correcting section performs a correcting operation of removing a signal component from the predetermined light receiving areas of the light receiving section which component is used by the tracking error detecting section, the signal component being contained in the signals from the predetermined light receiving areas of the light receiving section which signals are used by the focus error detecting section, the signal component corresponding to optical crosstalk,
an interlayer movement control section which, when the optical disk has a plurality of the information layers, controls the moving section so that a convergent point of the light beam moves from any of the information layers to another of the information layers, and
wherein the correcting section performs the correcting operation on the basis of an operation of the interlayer movement control section.

2. The optical disk device according to claim 1, wherein the interlayer movement control section has a determining section determining a polarity of the optical crosstalk in the source information layer from which the light beam is moved and the destination information layer to which the light beam is moved, and
if a result of the determination by the determining section indicates that the polarity of the optical crosstalk differs between the source information layer and the destination layer, the correcting operation is not performed at least during the interlayer movement.

3. The optical disk device according to claim 2, wherein the determining section determines a polarity of the mark or the pit on each of the information layers in the optical disk, and if the polarity of the mark or the pit differs between the source information layer and the destination information layer, the determining section determines that the polarity of the optical crosstalk differs between the source information layer and the destination information layer.

4. The optical disk device according to claim 1, wherein the correcting section performs the correcting operation by changing a gain for the correction on the basis of a setting specified for each of the information layers.

5. The optical disk device according to claim 4, further comprising a storage section storing the setting for each of the information layers.

6. The optical disk device according to claim 2, wherein the correcting section does not perform the correcting operation during the interlayer movement if the result of the determination fails to be obtained from the determining section.

7. The optical disk device according to claim 6, wherein the correcting section compares amplitude of a signal component from the predetermined light receiving areas of the light receiving section which component is used by the tracking error signal with amplitude of the focus error signal observed after the correcting operation, and according to a result of the comparison, changes the polarity of the gain for the correction.

* * * * *